United States Patent
Bober

(10) Patent No.: US 7,483,594 B2
(45) Date of Patent: Jan. 27, 2009

(54) METHOD, APPARATUS, COMPUTER PROGRAM, COMPUTER SYSTEM, AND COMPUTER-READABLE STORAGE MEDIUM FOR REPRESENTING AND SEARCHING FOR AN OBJECT IN AN IMAGE

(75) Inventor: Miroslaw Z. Bober, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/929,471

(22) Filed: Oct. 30, 2007

(65) Prior Publication Data

US 2008/0044108 A1 Feb. 21, 2008

Related U.S. Application Data

(62) Division of application No. 11/557,836, filed on Nov. 8, 2006, now Pat. No. 7,356,203, which is a division of application No. 11/101,637, filed on Apr. 8, 2005, now Pat. No. 7,162,105, which is a division of application No. 09/763,852, filed as application No. PCT/JP00/04400 on Jul. 3, 2000, now Pat. No. 6,882,756.

(30) Foreign Application Priority Data

Jul. 5, 1999 (GB) .................................. 9915698.6

(51) Int. Cl.
*G06K 9/54* (2006.01)
(52) U.S. Cl. ..................... 382/305; 382/199; 382/266
(58) Field of Classification Search ................ 382/103, 382/181, 199, 201, 203, 209, 218, 266, 305, 382/316; 358/3.27, 403; 707/1–10
See application file for complete search history.

(56) References Cited

U.S. PATENT DOCUMENTS

| 4,989,257 | A | * | 1/1991 | Horowitz ..................... 382/192 |
| 5,081,689 | A | | 1/1992 | Meyer et al. |
| 5,119,439 | A | | 6/1992 | Osawa et al. |
| 5,471,535 | A | * | 11/1995 | Ikezawa et al. ............. 382/199 |
| 5,487,116 | A | | 1/1996 | Nakano et al. |

(Continued)

FOREIGN PATENT DOCUMENTS

GB 2203877 A 10/1988

(Continued)

OTHER PUBLICATIONS

F. Mokhtarian, "Silhouetter-based occluded object recognition through curvature scale space.", *Machine Vision and Applications*, vol. 10, (1997), pp. 87-96.

(Continued)

*Primary Examiner*—Daniel G Mariam
(74) *Attorney, Agent, or Firm*—Birch, Stewart, Kolasch, & Birch, LLP.

(57) ABSTRACT

A method of representing an object appearing in a still or video image, by processing signals corresponding to the image, comprises deriving a plurality of numerical values associated with features appearing on the outline of an object starting from an arbitrary point on the outline and applying a predetermined ordering to said values to arrive at a representative of the outline.

11 Claims, 2 Drawing Sheets

U.S. PATENT DOCUMENTS

| | | |
|---|---|---|
| 5,881,171 A | 3/1999 | Kinjo et al. |
| 5,892,854 A | 4/1999 | de Queiroz et al. |
| 6,014,461 A | 1/2000 | Hennessey et al. |
| 6,044,171 A | 3/2000 | Polyakov et al. |
| 6,182,069 B1 | 1/2001 | Niblack et al. |
| 6,459,824 B1 | 10/2002 | Lee et al. |
| 6,931,154 B1 | 8/2005 | Bober et al. |

FOREIGN PATENT DOCUMENTS

| | | |
|---|---|---|
| GB | 2320352 | 6/1998 |
| JP | 2-075083 | 3/1990 |
| JP | 6-309465 A | 11/1994 |
| JP | 10-055447 | 2/1998 |
| WO | WO-88/02158 | 3/1988 |
| WO | WO-99/17250 | 4/1999 |

OTHER PUBLICATIONS

F. Mokhtarian, "Silhouette-Based Isolated Object Recognition through Curvature Scale Space.", *IEEE Transactions On Pattern Analysis and Machine Intelligence*, vol. 17 No. 5, (1995), pp. 539-544.

Hamano, "A similarity retrieval method for image databases using simple graphics," IEEE, pp. 149-154, 1988.

Farzin Mokhtarian et al., "Robust and Efficient Shape Indexing through Curvature Scale Space," Proc. British Machine Vision Conference, pp. 53-62, Edinburgh, UK, 1996.

Farzin Mokhtarian et al., "Indexing an Image Database by Shape Content Using Curvature Scale Space," Proc. IEE Colloguium on Intelligent Databases, London, 1996.

* cited by examiner

METHOD, APPARATUS, COMPUTER PROGRAM, COMPUTER SYSTEM, AND COMPUTER-READABLE STORAGE MEDIUM FOR REPRESENTING AND SEARCHING FOR AN OBJECT IN AN IMAGE

This application is a Divisional of application Ser. No. 11/557,836, filed on Nov. 8, 2006 which is now U.S. Pat. No. 7,356,203 issued on Apr. 8, 2008, which is a Division of application Ser. No. 11/101,637, filed on Apr. 8, 2005 which is now U.S. Pat. No. 7,162,105 issued on Jan. 9, 2007, which in turn is a Division of application Ser. No. 09/763,852, filed on Feb. 28, 2001, which is now U.S. Pat. No. 6,882,756 issued on Apr. 19, 2005, and for which priority is claimed under 35 U.S.C. §120. Application Ser. No. 09/763,852 (U.S. Pat. No. 6,882,756) is the national phase of PCT International Application No. PCT/JP00/04400 filed on Jul. 3, 2000 and U.K. Application No. 9915698.6 filed in the United Kingdom on Jul. 5, 1999. The entire contents of each of the above-identified applications are hereby incorporated by reference.

TECHNICAL FIELD

The present invention relates to the representation of an object appearing in a still or video image, such as an image stored in a multimedia database, especially for searching purposes, and to a method and apparatus for searching for an object using such a representation.

BACKGROUND ART

In applications such as image or video libraries, it is desirable to have an efficient representation and storage of the outline or shape of objects or parts of objects appearing in still or video images. A known technique for shape-based indexing and retrieval uses Curvature Scale Space (CSS) representation. Details of the CSS representation can be found in the papers "Robust and Efficient Shape Indexing through Curvature Scale Space" Proc. British Machine Vision conference, pp 53-62, Edinburgh, UK, 1996 and "Indexing an Inage Database by Shape Content using Curvature Scale Space" Proc. IEE Colloquium on Intelligent Databases, London 1996, both by F. Mokhtarian, S. Abbasi and J. Kittler, the contents of which are incorporated herein by reference.

The CSS representation uses a curvature function for the outline of the object, starting from an arbitrary point on the outline. The curvature function is studied as the outline shape is evolved by a series of deformations which smooth the shape. More specifically, the zero crossings of the derivative of the curvature function convolved with a family of Gaussian filters are computed. The zero crossings are plotted on a graph, known as the Curvature Scale Space, where the x-axis is the normalised arc-length of the curve and the y-axis is the evolution parameter, specifically, the parameter of the filter applied. The plots on the graph form loops characteristic of the outline. Each convex or concave part of the object outline corresponds to a loop in the CSS image. The co-ordinates of the peaks of the most prominent loops in the CSS image are used as a representation of the outline.

To search for objects in images stored in a database matching the shape of an input object, the CSS representation of an input shape is calculated. The similarity between an input shape and stored shapes is determined by comparing the position and height of the peaks in the respective CSS images using a matching algorithm.

A problem with the known CSS representation is that the peaks for a given outline are based on the curvature function which is computed starting from an arbitrary point on the outline. If the starting point is changed, then there is a cyclic shift along the x-axis of the peaks in the CSS image. Thus, when a similarity measure is computed, all possible shifts need to be investigated, or at least the most likely shift. This results in increased complexity in the searching and matching procedure.

Accordingly the present invention provides a method of representing an object appearing in a still or video image, by processing signals corresponding to the image, the method comprising deriving a plurality of numerical values associated with features appearing on the outline of an object starting from an arbitrary point on the outline and applying a predetermined ordering to said values to arrive at a representation of the outline. Preferably, said values are derived from a CSS representation of said outline, and preferably they correspond to the CSS peak values.

As a result of the invention, the computation involved in matching procedures can be greatly reduced, without a significant reduction in the retrieval accuracy.

DISCLOSURE OF INVENTION

A method of representing an object appearing in a still or video image, by processing signals corresponding to the image described herein, the method comprises deriving a plurality of numerical values associated with features appearing on the outline of an object starting from an arbitrary point on the outline and applying a predetermined ordering to said values to arrive at a representation of the outline.

In a method described herein, the predetermined ordering is such that the resulting representation is independent of the starting point on the outline.

In a method described herein, the numerical values reflect points of inflection on the curve.

In a method described herein, a curvature scale space representation of the outline is obtained by smoothing the outline in a plurality of stages using a smoothing parameter sigma, resulting in a plurality of outline curves, using values for the maxima and minima of the curvature of each outline curve to derive curves characteristic of the original outline, and selecting the co-ordinates of peaks of said characteristic curves as said numerical values.

In a method described herein, the co-ordinates of the characteristic curves correspond to an arc-length parameter of the outline and the smoothing parameter.

In a method described herein, the peak co-ordinate values are ordered on the basis of the peak height values, corresponding to the smoothing parameter.

In a method described herein, the values are ordered starting from the greatest value.

In a method described herein, the values are ordered in decreasing size.

In a method described herein, the values are ordered starting from the smallest value.

A method of representing an object appearing in a still or video image, by processing signals corresponding to the image described herein, the method comprises deriving a plurality of numerical values associated with features appearing on the outline of an object to represent said outline and deriving a factor indicating the reliability of said representation using a relationship between at least two of said values.

In a method described herein, the factor is based on the ratio between two of said values.

In a method described herein, the ratio is of the two greatest values.

In a method described herein, a curvature scale space representation of the outline is obtained by smoothing the outline in a plurality of stages using a smoothing parameter sigma, resulting in a plurality of outline curves, using values for the maxima and minima of the curvature of each outline curve to derive curves characteristic of the original outline, and selecting the co-ordinates of peaks of said characteristic curves as said numerical values.

The values are derived using a method as described herein.

A method of searching for an object in a still or video image by processing signals corresponding to images as described herein, the method comprises inputting a query in the form of a two-dimensional outline, deriving a descriptor of said outline using a method as described herein, obtaining a descriptor of objects in stored images derived using a method as described herein and comparing said query descriptor with each descriptor for a stored object, and selecting and displaying at least one result corresponding to an image containing an object for which the comparison indicates a degree of similarity between the query and said object.

A factor is derived for the query outline and for each stored outline using a method as described herein, and the comparison is made using the predetermined ordering only or the predetermined ordering and some other ordering depending on said factors.

A method of representing a plurality of objects appearing in still or video images, by processing signals corresponding to the images described herein, the method comprises deriving a plurality of numerical values associated with features appearing on the outline of each object and applying the same predetermined ordering to said values for each outline to arrive at a representation of each outline.

An apparatus is adapted to implement a method as described herein.

A computer program implements a method as described herein.

A computer system is programmed to operate according to a method as described herein.

A computer-readable storage medium stores computer-executable process steps for implementing a method as described herein.

A method of representing objects in still or video images is described with reference to the accompanying drawings.

A method of searching for objects in still or video images is described with reference to the accompanying drawings.

A computer system is described with reference to the accompanying drawings.

BEST MODE FOR CARRYING OUT THE INVENTION

First Embodiment

Figure 1:
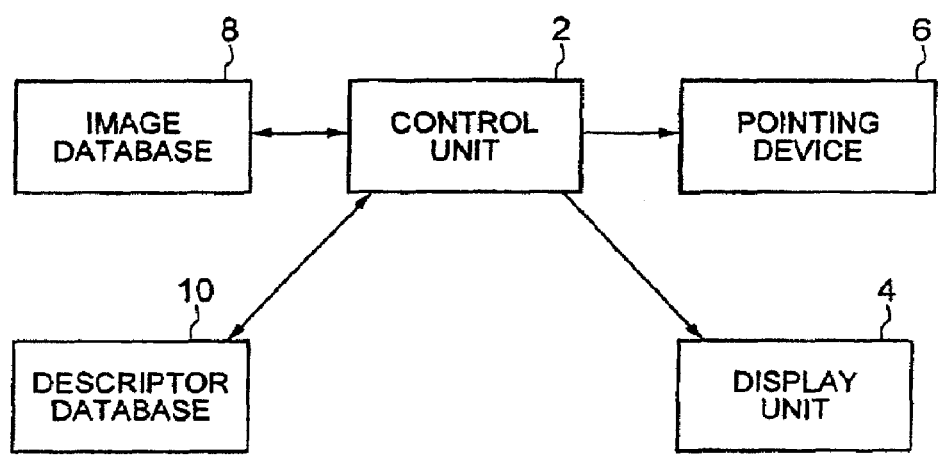
FIG. 1 is a block diagram of a video database system.

FIG. 1 shows a computerized video database system according to an embodiment of the invention. The system includes a control unit 2 in the form of a computer, a display unit 4 in the form of a monitor, a pointing device 6 in the form of a mouse, an image database 8 including stored still and video images and a descriptor database 10 storing descriptors of objects or parts of objects appearing in images stored in the image database 8.

A descriptor for the shape of each object of interest appearing in an image in the image database is derived by the control unit 2 and stored in the descriptor database 10. The control unit 2 derives the descriptors operating under the control of a suitable program implementing a method as described below.

Firstly, for a given object outline, a CSS representation of the outline is derived. This is done using the known method as described in one of the papers mentioned above.

More specifically, the outline is expressed by a representation $\Psi = \{(x(u), y(u), u \in [0, 1]\}$ where u is a normalised arc length parameter.

The outline is smoothed by convolving $\Psi$ with an 1D Gaussian kernel $g(u, \sigma)$, and the curvature zero crossings of the evolving curve are examined as $\sigma$ changes. The zero crossing are identified using the following expression for the curvature:

$$k(u, \sigma) = \frac{X_u(u, \sigma)Y_{uu}(u, \sigma) - X_{uu}(u, \sigma)Y_u(u, \sigma)}{(X_u(u, \sigma)^2 + Y_u(u, \sigma)^2)^{3/2}}$$

where $$X(u, \sigma) = x(u) * g(u, \sigma) \quad Y(u, \sigma) = y(u) * g(u, \sigma)$$

and $$X_u(u, \sigma) = x(u) * g_u(u, \sigma) \quad X_{uu}(u, \sigma) = x(u) * g_{uu}(u, \sigma)$$

In the above, * represents convolution and subscripts represent derivatives.

The number of curvature zero crossings changes as $\sigma$ changes, and when $\sigma$ is sufficiently high $\Psi$ is a convex curve with no zero crossings.

The zero crossing points $(u, \sigma)$ are plotted on a graph, known as the CSS image space. This results in a plurality of curves characteristic of the original outline. The peaks of the characteristic curves are identified and the corresponding co-ordinates are extracted and stored. In general terms, this gives a set of n co-ordinate pairs [(x1,y1), (x2,y2), ... (xn, yn)], where n is the number of peaks, and xi is the arc-length position of the ith peak and yi is the peak height.

The order and position of characteristic curves and the corresponding peaks as they appear in the CSS image space depends on the starting point for the curvature function described above. According to the invention, the peak co-ordinates are re-ordered using a specific ordering function.

Ordering is performed by a one-to-one mapping T of the peak indices {1 ... n} to a new set of indices {1 ... n}.

In this embodiment, the co-ordinate pairs are ordered by considering the size of the y co-ordinates. Firstly, the highest peak is selected. Suppose the kth peak is the most prominent. Then (xk, yk) becomes the first in the ordered set of values. In other words, T(k)=1. Similarly, the other peak co-ordinates are re-ordered in terms of decreasing peak height. If two peaks have the same height, then the peak having the x-co-ordinate closest to that of the preceding co-ordinate pair is placed first. In other words, each co-ordinate pair having an original index i is assigned a new index j where T(i)=j and yj>=y(j+1). Also, each value xi is subjected to a cyclic shift of −xk.

Figure 2:
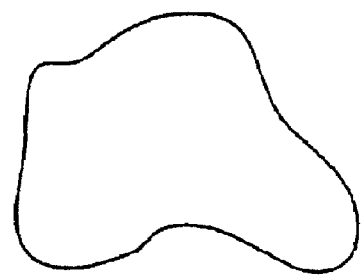
FIG. 2 is a drawing of an outline of an object.
Figure 3:
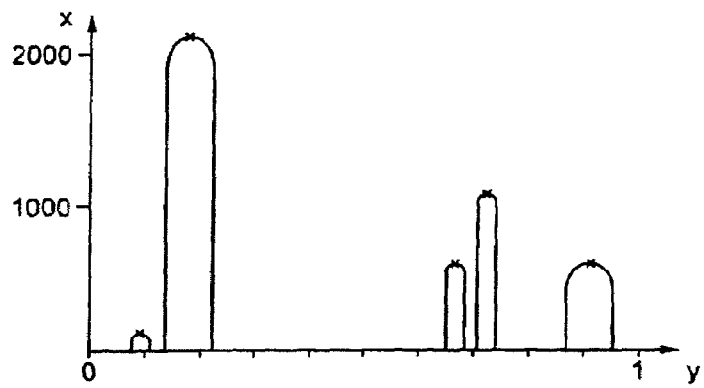
FIG. 3 is a CSS representation of the outline of FIG. 2.

As a specific example, the outline shown in FIG. 2 results in a CSS image as shown in FIG. 3. Details of the co-ordinates of the peaks of the curves in the CSS image are given in Table 1 below.

TABLE 1

| Peak Index | X | Y |
|---|---|---|
| 1 | 0.124 | 123 |
| 2 | 0.68 | 548 |
| 3 | 0.22 | 2120 |
| 4 | 0.773 | 1001 |
| 5 | 0.901 | 678 |

The peaks are ordered using the ordering described above. In other words, the co-ordinates are ordered in terms of decreasing peak height. Also, the x co-ordinates are all shifted towards zero by an amount equal to the original x co-ordinate of the highest peak. This results in re-ordered peak co-ordinates as given in Table 2 below.

TABLE 2

| Peak Index | X | Y |
|---|---|---|
| 1 | 0 | 2120 |
| 2 | 0.553 | 1001 |
| 3 | 0.681 | 678 |
| 4 | 0.46 | 548 |
| 5 | 0.904 | 123 |

These re-ordered peak co-ordinates form the basis of the descriptor stored in the database 10 for the object outline. In this embodiment, the peak co-ordinates are stored in the order shown in Table 2. Alternatively, the co-ordinates can be stored in the original order, together with an associated indexing indicating the new ordering.

Second Embodiment

An alternative method of representing the object outline according to a second embodiment will now be described.

A CSS representation of the outline is derived as described above. However, the ordering of the peak co-ordinates is different from the ordering in Embodiment 1 described above. More specifically, firstly the highest peak is selected. Suppose peak k is the most prominent one. Then (xk,yk) becomes the first peak in the ordered set of peaks. The subsequent peaks are ordered so that for peak co-ordinates of original index i, then $T(i)=j$, and $xj<=x(j+1)$. Also, all values xi are shifted downwards by an amount xk equal to the original x co-ordinate of original peak k.

In other words, in the ordering method according to embodiment 2, the highest peak is selected and placed first, and then the remaining peaks follow in the original sequence starting from the highest peak.

Table 3 below shows the peak values of Table 1 ordered according to the second embodiment.

TABLE 3

| Peak Index | X | Y |
|---|---|---|
| 1 | 0 | 2120 |
| 2 | 0.46 | 548 |
| 3 | 0.553 | 1001 |
| 4 | 0.681 | 678 |
| 5 | 0.904 | 123 |

In a development of embodiments 1 and 2 described above, a confidence factor (CF) is additionally associated with each representation of a shape. The CF is calculated from the ratio of the second highest and the highest peak values for a given shape.

For the outline shown in FIG. 2, the CF value is CF=1001/2120. In this example, the CF is quantized by rounding to the nearest 0.1 to reduce storage requirements. Accordingly, here CF=0.5.

The CF value in this example is a reflection of the accuracy or uniqueness of the representation. Here, a CF value close to one means low confidence and a CF value close to zero means high confidence. In other words, the closer are the two highest peak values, the less likely it is that the representation is accurate.

The CF value can be useful when performing a matching procedure, as will be shown in the following description.

Third Embodiment

Figure 4:
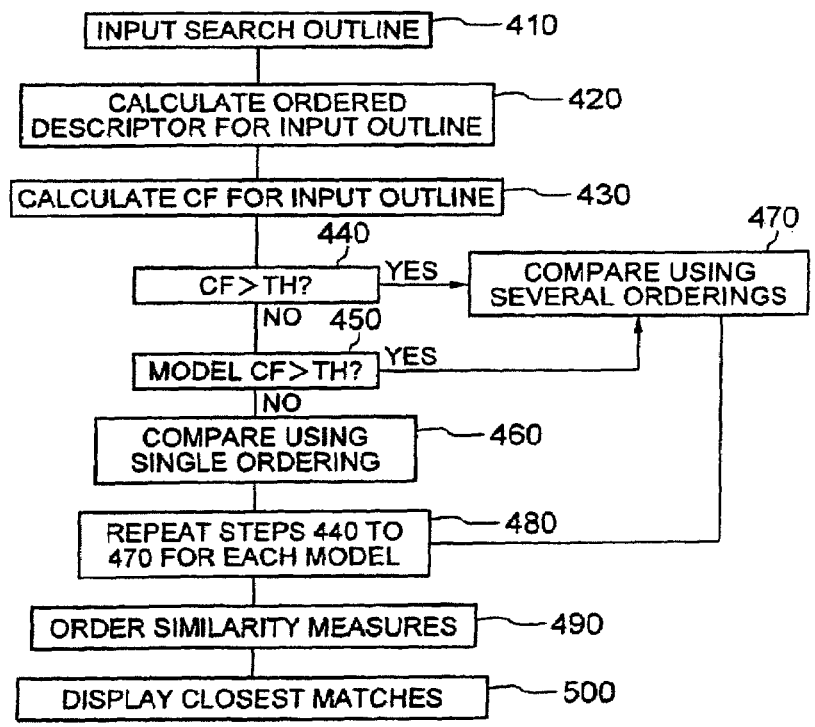
FIG. 4 is a block diagram illustrating a searching method.

A method of searching for an object in an image in accordance with an embodiment of the invention will now be described with reference to FIG. 4 which is a block diagram of the searching method.

Here, the descriptor database 10 of the system of FIG. 1 stores descriptors derived according to the first ordering method described above together with associated CF values.

The user initiates a search by drawing an object outline on the display using the pointing device (step 410). The control unit 2 then derives a CSS representation of the input outline and orders the peak co-ordinates in accordance with the same ordering function used for the images in the database to arrive at a descriptor for the input outline (step 420). The control unit 2 then also calculates a CF value for the input outline by calculating the ratio of the second highest peak value to the highest peak value and quantizing the result (step 430).

The control unit 2 then compares the CF value for the input outline with a predetermined threshold (step 440). In this example, the threshold is 0.75. If the CF value is lower than the threshold, indicating a relatively high confidence in the accuracy of the input descriptor, then the next step is to consider the CF value for the model (i.e. image stored in the database) under consideration. If the model CF is also lower than the threshold (step 450), then the input and model are compared using the respective descriptors in the predetermined ordering only (step 460). If CF for either the input or the model is greater than the threshold, then matching is performed by comparing all possible different orderings of the co-ordinate values in the input descriptors with the model descriptor in the database (step 470).

The matching comparison is carried out using a suitable algorithm resulting in a similarity measure for each descriptor in the database. A known matching algorithm such as described in the above-mentioned papers can be used. That matching procedure is briefly described below.

Given two closed contour shapes, the image curve $\Psi i$ and the model curve $\Psi m$ and their respective sets of peaks $\{(xi1,yi1),(xi2,yi2), \ldots ,(xin,yin)\}$ and $\{(xm1,ym1), (xm2, ym2), \ldots , (xmn,ymn)\}$ the similarity measure is calculated. The similarity measure is defined as a total cost of matching of peaks in the model into peaks in the image. The matching which minimises the total cost is determined using a dynamic programming. The algorithm recursively matches the peaks from the model to the peaks from the image and calculates the cost of each such match. Each model peak can be matched with only one image peak and each image peak can be matched with only one model peak. Some of the model and or image peak may remain unmatched, and there is an additional penalty cost for each unmatched peak. Two peaks can be matched if their horizontal distance is less then 0.2. The cost of a match is the length of the straight line between the two matched peaks. The cost of an unmatched peak is its height.

In more detail the algorithm works by creating and expanding a tree-like structure, where nodes correspond to matched peaks:

1. Create starting node consisting of the largest maximum of the image (xik, yik) and the largest maximum of the model (xir,yir).

2. For each remaining model peak which is within 80 percent of the largest maximum of the image peaks create an additional starting node.

3. Initialise the cost of each starting node created in 1 and 2 to the absolute difference of the y-coordinate of the image and model peaks linked by this node.

4. For each starting node in 3, compute the CSS shift parameter alpha, defined as the difference in the x (horizontal) coordinates of the model and image peaks matched in this starting node. The shift parameter will be different for each node.

5. For each starting node, create a list of model peaks and a list of image peaks. The list hold information which peaks are yet to be matched. For each starting node mark peaks matched in this node as "matched", and all other peaks as "unmatched".

6. Recursively expand a lowest cost node (starting from each node created in steps 1-6 and following with its children nodes) until the condition in point 8 is fulfilled. To expand a node use the following procedure:

7. Expanding a node:
   If there is at least one image and one model peak left unmatched:
   select the largest scale image curve CSS maximum which is not matched (xip,yip). Apply the starting node shift parameter (computed in step 4) to map the selected maximum to the model CSS image—now the selected peak has coordinates (xip-alpha, yip). Locate the nearest model curve peak which is unmatched (xms,yms). If the horizontal distance between the two peaks is less then 0.2 (i.e.: |xip-alpha-xms|<0.2), match the two peaks and define the cost of the match as the length of the straight line between the two peaks. Add the cost of the match to the total cost of that node. Remove the matched peaks from the respective lists by marking them as "matched". If the horizontal distance between the two peaks is greater than 0.2, the image peak (xip,yip) cannot be matched. In that case add its height yip to the total cost and remove only the peak (xip,yip) from the image peak list by marking it as "matched".

Otherwise (There are only image peaks or there are only model peaks left unmatched):
   Define the cost of the match as the height of the highest unmatched image or model peak and remove that peak from the list.

8. If after expanding a node in 7 there are no unmatched peaks in both the image and model lists, the matching procedure is terminated. The cost of this node is the similarity measure between the image and model curve. Otherwise, go to point 7 and expand the lowest cost node.

The above procedure is repeated with the image curve peaks and the model curve peaks swapped. The final matching value is the lower of the two.

As another example, for each position in the ordering, the distance between the input x value and the corresponding model x value and the distance between the input y value and the corresponding model y value are calculated. The total distance over all the positions is calculated and the smaller the total distance, the closer the match. If the number of peaks for the input and the model are different, the peak height for the leftovers is included in the total distance.

The above steps are repeated for each model in the database (step 480).

The similarity measures resulting from the matching comparisons are ordered (step 490) and the objects corresponding to the descriptors having similarity measures indicating the closest match (i.e. here the lowest similarity measures) are then displayed on the display unit 4 for the user (step 500). The number of objects to be displayed can be pre-set or selected by the user.

In the above embodiment, if the CF value is greater than the threshold, then all possible orderings of the input descriptor values are considered in the matching. It is not necessary to consider all possible orderings, and instead only some possible orderings may be considered, such as some or all cyclic shifts of the original CSS representation. Furthermore, in the above embodiment, the threshold value is set to 0.75, but the threshold can be set to different levels. For example, if the threshold is set to zero, then all matches are performed by analysis of some or all possible orderings. This increases the amount of computation required compared with case when threshold is above zero, but since the peaks have already been ordered and their x-coordinate adjusted for a particular starting point or object rotation, the amount of computation required is reduced compared with the original system where no such adjustment has been made. Consequently, by setting the threshold to zero the system offers some reduction in computational cost and the retrieval performance is exactly the same as in the original system.

Alternatively, if the threshold is set to one, then matching is performed using only the stored ordering. There is then a significant reduction in computation required, with only a small deterioration in retrieval accuracy.

Various modifications of the embodiments described above are possible. For example, instead of ordering the CSS peak co-ordinate values as described in embodiments 1 and 2 other orderings can be used. For example, the values can be placed in order of increasing rather than decreasing peak height. Instead of storing the ordered values in the database, the ordering can be carried out during the matching procedure.

INDUSTRIAL APPLICABILITY

A system according to the invention may, for example, be provided in an image library. Alternatively, the databases may be sited remote from the control unit of the system, connected to the control unit by a temporary link such as a telephone line or by a network such as the internet. The image and descriptor databases may be provided, for example, in permanent storage or on portable data storage media such as CD-ROMs or DVDs.

Components of the system as described may be provided in software or hardware form. Although the invention has been described in the form of a computer system, it could be implemented in other forms, for example using a dedicated chip.

Specific examples have been given of methods of representing a 2D shape of an object and of methods for calculating values representing similarities between two shapes but any suitable such methods can be used.

The invention can also be used, for example, for matching images of objects for verification purposes, or for filtering.

The invention claimed is:

1. A method of representing an object appearing in an image or a sequence of images, by processing signals corresponding to the image or images, the method comprising:

deriving a curvature scale space (CSS) representation of an outline of an object starting from an arbitrary point on the outline, by smoothing the outline in a plurality of stages using a smoothing parameter, resulting in a plurality of outline curves;

using values for points of inflection of each outline curve to derive characteristic curves which are characteristic of the original outline;

selecting first co-ordinates of peaks of said characteristic curves, which correspond to the smoothing parameter, and corresponding second co-ordinate values representing the positions on the outline corresponding to the peaks; and shifting one of the second co-ordinate values to zero, and shifting all the remaining second co-ordinate values corresponding to said peaks by an amount equivalent to the original co-ordinate value of the second co-ordinate value shifted to zero.

2. A method as claimed in claim 1 wherein the second co-ordinate values are cyclic within a predetermined range.

3. A method as claimed in claim 2 wherein the second co-ordinate values represent normalised distance or arc-length along the contour.

4. A method as claimed in claim 1 wherein the second co-ordinate values represent distance or arc-length along the contour.

5. A method as claimed in claim 1 comprising ordering on the basis of the first co-ordinate values before shifting on the basis of the second co-ordinate values.

6. A method as claimed in claim 5 wherein the first values are ordered starting from the greatest value.

7. A method as claimed in claim 5 wherein the first values are ordered in decreasing size.

8. A method of searching for an object in an image or sequence of images by processing signals corresponding to images, the method comprising:

inputting a query in the form of a two-dimensional outline;

deriving a query descriptor of said outline using a method as claimed in claim 1;

obtaining a descriptor of objects in stored images derived using a method as claimed in claim 1;

comparing said query descriptor with each obtained descriptor for a stored object, and selecting and displaying at least one result corresponding to an image containing an object for which the comparison indicates a degree of similarity between the query and said object.

9. An apparatus comprising:

an image database storing still or video images;

a descriptor database storing descriptor of objects or parts of objects appearing the images stored in the image database; and a processor configured to perform the method as claimed in claim 1 or claim 8.

10. A computer-readable storage medium storing computer-executable process steps for implementing a method as claimed in claim 1 or claim 8.

11. A computer system comprising:

an image database storing still or video images;

a descriptor database storing descriptors of objects or parts of objects appearing in the images stored in the image database; and a control unit programmed to perform the method as claimed in claim 1 or claim 8.

* * * * *